(12) United States Patent
Baehrle-Miller et al.

(10) Patent No.: US 12,325,408 B2
(45) Date of Patent: Jun. 10, 2025

(54) METHOD FOR OPERATING A BRAKE SYSTEM OF A MOTOR VEHICLE

(71) Applicant: Robert Bosch GmbH, Stuttgart (DE)

(72) Inventors: Frank Baehrle-Miller, Schoenaich (DE); Benjamin Heer, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 130 days.

(21) Appl. No.: 18/252,809

(22) PCT Filed: Nov. 3, 2021

(86) PCT No.: PCT/EP2021/080463
§ 371 (c)(1),
(2) Date: May 12, 2023

(87) PCT Pub. No.: WO2022/117270
PCT Pub. Date: Jun. 9, 2022

(65) Prior Publication Data
US 2023/0415718 A1    Dec. 28, 2023

(30) Foreign Application Priority Data

Dec. 2, 2020   (DE) ..................... 10 2020 215 174.1

(51) Int. Cl.
*B60T 8/96*      (2006.01)
*B60Q 9/00*      (2006.01)
(Continued)

(52) U.S. Cl.
CPC .................. *B60T 8/96* (2013.01); *B60Q 9/00* (2013.01); *B60T 8/885* (2013.01); *B60T 13/58* (2013.01);
(Continued)

(58) Field of Classification Search
CPC . B60T 8/96; B60T 8/885; B60T 13/58; B60T 2250/00; B60T 2250/04; B60T 2270/416; B60Q 9/00
(Continued)

(56) References Cited

FOREIGN PATENT DOCUMENTS

| CN | 108025718 A | * | 5/2018 | ............ B60T 13/588 |
| DE | 10 2012 212 329 A1 | | 4/2014 | |

(Continued)

OTHER PUBLICATIONS

International Search Report corresponding to PCT Application No. PCT/EP2021/080463, mailed Feb. 8, 2022 (German and English language document) (5 pages).

*Primary Examiner* — Mahmoud Gimie
(74) *Attorney, Agent, or Firm* — Maginot, Moore & Beck LLP

(57) ABSTRACT

A method is for operating a brake system of a motor vehicle. The brake system includes at least one service brake and a transmission device having an output rod, by way of which a braking force is transmitted to the at least one service brake. The brake system further includes at least one parking brake having a trigger device for activating the at least one parking brake. The method provides increased safety and simplified implementation by (i) using an adjustment travel of the output rod to ascertain a deceleration acting on the motor vehicle due to the at least one service brake, and (ii) activating the at least one parking brake, when the trigger device is actuated, when the motor vehicle is ascertained as being stationary, taking into consideration the deceleration.

10 Claims, 2 Drawing Sheets

(51) Int. Cl.
  *B60T 8/88* (2006.01)
  *B60T 13/58* (2006.01)
(52) U.S. Cl.
  CPC ....... *B60T 2250/00* (2013.01); *B60T 2250/04* (2013.01); *B60T 2270/416* (2013.01)
(58) Field of Classification Search
  USPC .......................................................... 701/70
  See application file for complete search history.

(56) References Cited

FOREIGN PATENT DOCUMENTS

| | | |
|---|---|---|
| DE | 10 2019 200 827 A1 | 7/2020 |
| EP | 2 055 541 A1 | 5/2009 |
| JP | 2006-522709 A | 10/2006 |
| JP | 2010-214976 A | 9/2010 |
| JP | 5879974 B2 * | 3/2016 |
| JP | 2018-52267 A | 4/2018 |
| JP | 2019-89472 A | 6/2019 |
| WO | 89/01887 A1 | 3/1989 |
| WO | WO-2018177786 A1 * | 10/2018 ............ B60T 13/662 |

* cited by examiner

METHOD FOR OPERATING A BRAKE SYSTEM OF A MOTOR VEHICLE

This application is a 35 U.S.C. § 371 National Stage Application of PCT/EP2021/080463, filed on Nov. 3, 2021, which claims the benefit of priority to Serial No. DE 10 2020 215 174.1, filed on Dec. 2, 2020 in Germany, the disclosures of which are incorporated herein by reference in their entirety.

The disclosure relates to a method for operating a brake system of a motor vehicle, the brake system having a brake transmission device and an electric parking brake device. The disclosure further relates to a motor vehicle having a brake system operated in this way.

BACKGROUND

Motor vehicles typically comprise a brake system used for braking during travel, as well as what is referred to as a parking brake. For braking during travel, the brake system typically includes a brake, which is also referred to hereinafter as a service brake.

The parking brake function is typically accomplished via an associated parking brake device of the brake system. The parking brake device comprises at least one parking brake for this purpose. Activating the parking brake, also known as locking the parking brake, typically requires a trigger activated via a trigger device. For this purpose, the trigger device can comprise a button manually actuable by a user. The parking brake device is used to secure the motor vehicle so that the motor vehicle is prevented from rolling, particularly when in a parked position. To this end, the at least one parking brake is used to brake at least one wheel of the motor vehicle in a blocking manner.

For safety reasons, activation of the parking brake device, and thus the blocking brake of at least one wheel of the motor vehicle, is only performed when the motor vehicle is stationary. For this purpose, parking brake devices known from the prior art rely on rotational wheel speed sensors of the motor vehicle. The evaluation of the data supplied by rotational wheel speed sensors is usually performed in a control unit, usually an ESP control unit of the motor vehicle, in order to determine a speed of the motor vehicle and thus also to ascertain a stationary state of the motor vehicle. Only when the data supplied by the rotational wheel speed sensors indicates a stationary state of the motor vehicle does an activation of the parking brake device occur, even if the trigger device has already been previously actuated.

Problematic in this context is that, given a failure of the rotational wheel speed sensors and/or the control unit evaluating the rotational wheel speed sensor data, in particular the ESP control unit, evaluation of the rotational wheel speed sensor data is dependent on activation of the parking brake device. The intention thereby is to prevent the parking brake device from being activated while the vehicle is traveling, which leads to reduced or no availability of the parking brake device. In addition, the motor vehicle can subsequently also roll and thus move in the event of a necessary and/or desired activation of the parking brake device, e.g., when parking the motor vehicle.

The disclosure therefore relates to the object of providing improved or at least other embodiments of a method for operating a brake system of a motor vehicle of the aforementioned type, as well as for such a motor vehicle, which embodiments are in particular characterized by increased safety along with simple implementation.

This object is achieved according to the disclosure by means of the subject matter described herein.

SUMMARY

The disclosure is based on the general idea-particularly in the case of failure of a stationary state detection means of the motor vehicle using rotational wheel speeds of a motor vehicle—of activating a parking brake device which uses a braking force exerted by means of a brake transmission device as well as the resulting deceleration, i.e., negative acceleration, of the motor vehicle and utilizing a maximum possible speed of the motor vehicle in order to ascertain whether the motor vehicle is stationary, taking into account the maximum possible speed as well as the deceleration and the period of deceleration, the parking brake device not being activated until the motor vehicle is ascertained as being stationary when the parking brake function is triggered. As a result, it is possible in a simple and reliable way to activate the parking brake device even in the absence of information about rotational wheel speeds of the motor vehicle and/or failure regarding evaluation of rotational wheel speeds of the motor vehicle, (e.g., an ESP control unit), when the motor vehicle is stationary. Consequently, safety and availability are increased while simple and cost-efficient implementation is also increased.

The idea according to the disclosure is implemented in a method for operating a brake system of a motor vehicle. The brake system comprises a service brake device, the brake transmission device, and the parking brake device. The service brake device comprises at least one service brake, which is used to brake the motor vehicle while traveling. The brake transmission device comprises an output rod connected to the at least one service brake such that a braking force for braking is transmitted to the at least one service brake via the output rod. The parking brake device comprises at least one parking brake for securing the motor vehicle in place. The parking brake device further comprises a trigger device for activating the at least one parking brake. According to the disclosure, an adjustment travel of the output rod as well as a maximum possible speed of the motor vehicle are utilized in order to ascertain the stationary state of the motor vehicle. Depending on the adjustment travel, a deceleration of the motor vehicle exerted by the at least one service brake is determined and whether the motor vehicle is stationary when actuating the trigger device is ascertained based on the maximum possible speed, while taking into account the period of delay. It is thus ascertained whether the motor vehicle is stationary at a time of actuation of the trigger device (hereinafter also referred to as the time of actuation). In so doing, the at least one parking brake is activated when a stationary state is ascertained at the time of actuation.

The method according to the disclosure is preferably used when data of a rotational wheel speed sensor for measuring the rotational speed of at least one wheel of the motor vehicle is not available, e.g., because the rotational wheel speed sensor fails, and/or when an evaluation of the data of the rotational wheel speed sensor is not possible, in particular if a device evaluating the data is damaged or fails. Such a device, which evaluates the data, is in particular a control unit, e.g., an ESP control unit of the motor vehicle.

Consequently, the method according to the disclosure is particularly used if the ESP control unit has been damaged and/or failed. The method according to the disclosure thus allows the use of the parking brake device even in the event of a failure of the ESP control unit.

Accordingly, said determinations and/or utilization of the maximum speed are preferably independent of a rotational wheel speed measurement.

The maximum possible speed of the motor vehicle is preferably the maximum speed that the motor vehicle can achieve up to the time of the initial deceleration.

In principle, the maximum permitted speed of the motor vehicle can be utilized as the maximum possible speed.

Alternatively, a recently known speed of the motor vehicle can be taken into consideration for utilizing the maximal possible speed. In this case, a speed of the motor vehicle known at an initial time is therefore considered as the maximum possible speed.

The initial time can be the time of a failure of the rotational wheel speed sensor of the motor vehicle. Alternatively or additionally, the initial time can be the time of a failure of an ESP control unit of the motor vehicle. In particular, the method according to the disclosure can be triggered and performed thereby.

It is also conceivable to use the initial time of a stationary state of the motor vehicle, and thus a speed of zero, as the initial time point. This can be the case, e.g., with a previous activation of the at least one parking brake and/or the first start after a previous activation of the at least one parking brake.

Utilization of the maximum speed can in particular be performed by estimating the maximum possible speed starting from the speed at the initial time. For this purpose, it is particularly conceivable to take into account a maximum possible acceleration by the motor vehicle, e.g., by means of a drive device of the motor vehicle. In other words, when the maximum speed is utilized, it can be assumed that the motor vehicle is accelerated using the available means, in particular the drive device provided, at maximum power. Alternatively or additionally, a gradient can be taken into consideration during the journey. It is also conceivable to take into account any existing coordinates of the motor vehicle and their change, in particular GPS data and their change, in order to utilize the maximum speed.

As previously explained, the steps according to the disclosure are performed by taking actuation of the trigger device into account. Doing so has the particular consequence that activation of the at least one parking brake is advantageously not performed unless the trigger device is actuated. In other words, an activation of the at least one parking brake advantageously does not take place without actuation of the trigger device.

The transmission device can be designed as a brake booster and/or as an external power brake.

In principle, the brake booster can be designed as desired. Vacuum-powered brake boosters are conceivable, for example. In particular, the brake booster can be at least partially electrically operated, preferably electromechanically.

Transmission device can be coupled with an actuator such that actuation of the actuator can result in adjustment of the output rod and thus a change in the adjustment travel.

The actuator is typically manually actuated by a user, in particular a driver, in order to brake the motor vehicle during travel. The actuator is in particular a brake pedal or the like.

In at least semi-autonomously driving motor vehicles, the actuator can also be actuated autonomously via a control device of the motor vehicle.

At least one of the at least one parking brake(s) can correspond at least partially to one of the at least one service brake(s).

If the at least one parking brake is activated, it blocks at least one wheel of the motor vehicle, thus fixing it in place. The parking brake is therefore also known to the skilled person as a "parking brake". The blocking of the at least one wheel is thereby preferable until the at least one parking brake is deactivated. This deactivation can also be performed via the trigger device.

The trigger device is used as a trigger for activating the at least one parking brake. The activation of the at least one parking brake is therefore not triggered until the trigger device is actuated. Actuation of the trigger device is usually performed by the user of the motor vehicle. The trigger device can comprise a button and/or be actuated when moving a selector of the motor vehicle to the "parking position" and/or when moving an ignition of the motor vehicle to an "off" position.

In at least partially autonomously driving motor vehicles, the trigger device can also be actuated autonomously via a control device of the motor vehicle.

Determination of the deceleration via the adjustment travel is advantageously performed by ascertaining the braking force exerted by means of the brake transmission device. The braking force is thus determined and/or the braking force already determined for the brake transmission device is utilized. The braking force transmitted by means of the brake transmission device to the at least one service brake is dependent on the adjustment travel, whereby larger adjustment travel lengths preferably result in a higher braking force, and vice versa. Given that the adjustment travel is a parameter relevant to the brake transmission device, which is preferably provided and/or present in the brake transmission device automatically, the adjustment travel known automatically can be referred to in order to determine the deceleration in this way. The method and the implementation thereof are simplified in this way.

Advantageously, the at least one service brake is actuated using a fluid. The determination of the deceleration is preferably based on the pressure exerted on the fluid, also known to the skilled person as brake pressure. Via the output rod, a piston is preferably moved within a volume of a brake fluid, thus generating the pressure in the fluid. In this case, the brake pressure can in particular be determined based on the given dimensions of the piston and the volume. Preferably, the at least one service brake is hydraulically actuated, particularly using a brake fluid.

It is understood that changes in timing of the adjustment travel and thus the braking force are taken into account when determining the deceleration. In other words, the adjustment travel and the braking force in the present case are to be understood as corresponding chronological profiles of the adjustment travel and the braking force. This results in the chronological profile of the deceleration being determined and taken into consideration. By way of example, reference is made to a braking operation with various adjustment travels. For example, the at least one service brake can be first actuated at a first braking force, and then at a second braking force. An associated deceleration is in this case taken into account for the respective braking force and the period of time thereof. In other words, in a multi-stage braking operation, an associated deceleration is determined for the respective braking stage and taken into consideration given the respective associated time period when determining the stationary state of the power vehicle.

It is further understood that utilizing the maximum speed takes into account possible increases in the maximum speed. If, for example, an acceleration of the motor vehicle occurs before the motor vehicle is stationary, this leads to a corresponding increase in the maximum possible speed, so that a progression of the maximum possible speed is ultimately taken into consideration.

The determination of the stationary state of the motor vehicle can be made by ascertaining a current speed of the motor vehicle resulting from the deceleration and the time period based on the maximum possible speed. It is thus ascertained whether the current speed determined at the time of actuation of the trigger device means that the motor vehicle is stationary. This is particularly the case if the current speed determined is zero at the time of actuation. The at least one parking brake is thus activated when the current speed determined means a stationary state of the motor vehicle.

Alternatively, the duration for which the motor vehicle is stationary can be used to ascertain the stationary state of the vehicle based on the maximum possible speed and taking into account the deceleration and the time period thereof. If the actuation of the trigger device occurs at the end of said duration or thereafter, then the at least one parking brake is activated. This activation can be performed such that the parking brake device is activated when a difference between the actuation time and the initial time is greater than the duration.

Of course, both the current speed and duration can be considered in order to ascertain the stationary state.

As previously mentioned, respective corresponding profiles are considered, i.e., the deceleration and the maximum possible speed. This can be implemented by iteratively determining the current speed and/or duration.

If the trigger device is actuated before a stationary state of the motor vehicle has been ascertained, e.g., the determined speed at the actuation time not equal to zero and/or the difference between the actuation time and the initial time less than the duration, then the at least one parking brake is preferably not activated. The activation can be delayed until a stationary state is ascertained. In other words, the at least one parking brake is not activated until a stationary state of the motor vehicle is ascertained.

When the trigger device is actuated before the motor vehicle is ascertained as being stationary, a deceleration, in particular an additional deceleration, of the motor vehicle can be performed and the at least one parking brake will not be activated until the motor vehicle is ascertained as being stationary. The duration of the delay before activation of the at least one parking brake is reduced as a result.

Preferably, the at least one service brake is actuated at a predetermined braking force, and the at least one parking brake is activated when the motor vehicle is ascertained as being stationary.

Alternatively or additionally, when actuating the trigger device before the motor vehicle is ascertained as being stationary, a message with a request for a user to further actuate the trigger device can be output. Preferably, the motor vehicle is in this case decelerated during actuation of the trigger device, in particular additionally and preferably, at the specified predetermined braking force until the stationary state is ascertained.

It is understood that, in addition to the method, a motor vehicle comprising a brake system operated in this way is also within the scope of this disclosure. The relevant components of the motor vehicle are designed accordingly.

The motor vehicle further comprises a control device for performing the method, which device is designed accordingly. It is particularly conceivable to store the method according to the disclosure as a computer program product in the control device.

The control device can be or correspond to a component of the ESP control unit.

Embodiments in which the control device is separate from the ESP control unit are also conceivable. Thus, even in the event of a possible failure of the ESP control unit, the parking brake function is still possible, so its availability is further increased. The control device is in particular a main control unit of the motor vehicle. In this context, the main control unit can in particular also be used to control a drive device of the motor vehicle. Likewise, the control device can be a control unit of the brake transmission device.

Further important features and advantages of the disclosure follow from the dependent claims, the drawings, and the accompanying figure description in reference to the drawings.

It is understood that the aforementioned features and the features yet to be explained hereinafter can be used not only in the respectively specified combination, but also in other combinations, or alone, without departing from the scope of the disclosure.

BRIEF DESCRIPTION OF THE DRAWINGS

Preferred embodiments of the disclosure are illustrated in the drawings and explained in greater detail in the description below, in which identical reference signs refer to similar or functionally identical components.

Shown are.

DETAILED DESCRIPTION

Figure 1:
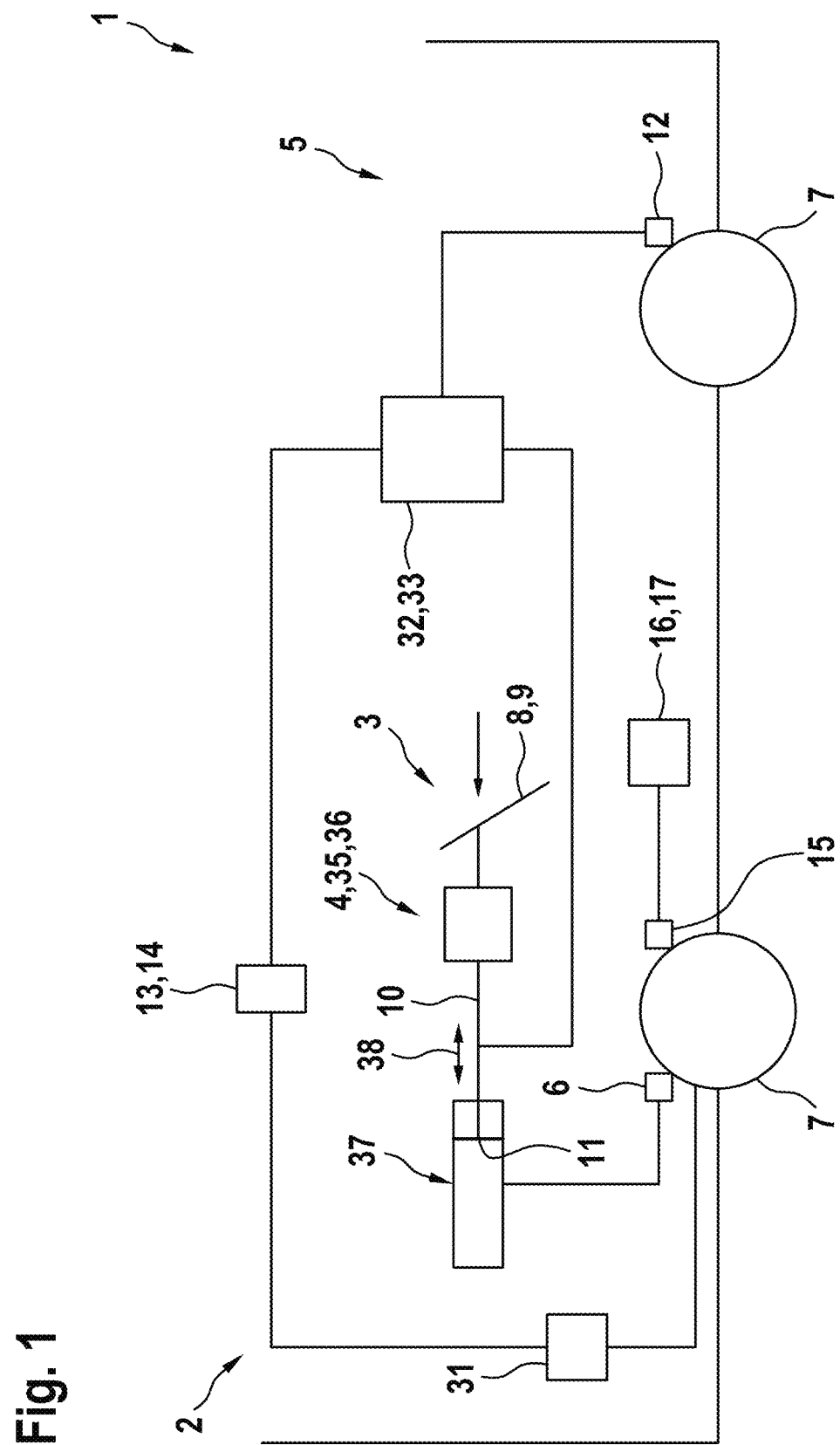
FIG. 1 — a schematic, highly simplified and schematic representation of a motor vehicle with a brake system.

A motor vehicle 1, as shown by way of example in FIG. 1 as a highly simplified and schematic representation, comprises a brake system 2. The brake system 2 comprises a service brake device 3, a brake transmission device 4, and a parking brake device 5. The service brake device 3 is used to brake the motor vehicle 1 while driving. For this purpose, the service brake device 3 comprises at least one brake 6 (referred to hereinafter also as the service brake 6), which acts on at least one wheel 7 of the motor vehicle 1. In FIG. 1, two wheels 7 of the motor vehicle 1 are visible purely by way of example. Also shown purely by way of example is a single service brake 6, which acts on one of the associated wheels 7 upon actuation of the service brake device 3 in order to brake the motor vehicle 1. To apply a braking force, an output rod 10 of the brake transmission device 4 cooperates with the at least one service brake 6. The brake transmission device 4 is, e.g., a brake booster 35, in particular an electromechanical brake booster 35, or an external power brake 36. In the exemplary embodiment shown, the brake transmission device 4 is coupled with an actuator 8 which can, when actuated, effect an adjustment of the output rod 10. In the exemplary embodiment shown, the actuator 8 is a brake pedal 9, which is actuated by a user (not shown; indicated by an arrow). The at least one service brake 6 of the exemplary embodiment shown is hydraulically operated. To this end, the service brake 6 is caused to apply a braking force using a brake fluid stored in a cylinder 37. In the exemplary embodiment shown, a piston 11 is guided within the cylinder 37 to apply the brake fluid. In this case, the output rod 10 is connected to the piston 11 so that adjustment of the output rod along the adjustment travel 38 indicated in FIG. 1 results in movement of the piston 11 within the cylinder 37. To brake, the piston 11 presses the brake fluid at a pressure corresponding to the braking force in the direction of the service brake 6, which pressure is known to the skilled person as brake pressure. The braking force exerted by the service brake 6 is thus dependent on the adjustment travel. The brake pressure can be determined given knowledge in particular of the adjustment travel, the dimensions of the piston 11, the cylinder 37, and the corresponding volume therein. Using the brake pressure and thus the braking force, a deceleration, i.e., a negative acceleration of the motor vehicle 1 can be determined given knowledge of the circumstances of the motor vehicle 1.

The purpose of the parking brake device 5 is to secure the motor vehicle 1 against movement, e.g., rolling away, in particular when in a parking position. For this purpose, the parking brake device 5 blocks at least one wheel 7 of the motor vehicle 1. For this purpose, the parking brake device 5 comprises at least one brake 12 (hereinafter also referred to as a parking brake 12), which is also known to the skilled person as a parking brake 12. The at least one parking brake 12 in an activated state blocks at least one wheel 7 of the motor vehicle 1. In the exemplary embodiment shown in FIG. 1, a parking brake 12 of the parking brake device 5 is shown purely by way of example, in which case the parking brake 12 (also shown purely by way of example) cooperates with the wheel 7, which is different in the service brake 6. However, embodiments in which the parking brake 12 at least partially corresponds to the service brake 6 are also contemplated. To activate the at least one parking brake 6, the parking brake device 5 comprises a trigger device 13, which, for example, can comprise a button 14, which can be manually actuated by a user (not shown). If the trigger device 13 in the exemplary embodiment shown, in particular the button 14 thereof, is actuated and the motor vehicle 1 is stationary, then the at least one parking brake 6 is activated.

During normal operation, a rotational wheel speed sensor 15 is used to detect a stationary state of the motor vehicle 1, which sensor enables detection of the rotational speed of at least one wheel 7 of the motor vehicle 1. The data obtained by the rotational wheel speed sensor 15 are evaluated in an associated control unit 16, which is in particular an ESP control unit 17 of the motor vehicle 1, thus ascertaining the current speed of the motor vehicle 1 and consequently also a stationary state of the motor vehicle 1.

In particular, if such a determination of the stationary state of the motor vehicle 1 is not possible, e.g., if the rotational wheel speed sensor 15 and/or the control unit 16 have been damaged and/or have failed, the method for activating the at least one parking brake 6 is as follows.

A maximum possible speed of the motor vehicle 1 is utilized. In addition, the adjustment travel 38 of the brake transmission device 4 is utilized in order to determine the deceleration of the motor vehicle 1 applied using the at least one service brake 6, i.e., a negative acceleration of the motor vehicle 1. For example, the maximum possible speed can be the maximum allowable speed of the motor vehicle 1. The maximum possible speed can also be an estimate based on the speed at the initial time 0, in which case accelerations of the motor vehicle 1, e.g., by means of a drive device 31 of the motor vehicle 1 and/or a gradient, can be taken into consideration. The initial time can be, e.g., the time of the failure of the rotational wheel speed sensor 15 and/or control unit 16. Alternatively, the initial time can be a known stationary state of the motor vehicle 1, e.g., an activated state of the parking brake device 5.

In addition, the deceleration of the motor vehicle 1 is determined depending on the adjustment travel 38.

Using the maximum possible speed and the determined deceleration as well as the period of deceleration, it is then ascertained whether the motor vehicle 1 is stationary at the time of actuation of the trigger device 13 (hereinafter also referred to as the time of actuation). If this is the case, the at least one parking brake 6 is activated so that at least one wheel 7 of the motor vehicle 1 is blocked. If a stationary state is not ascertained at the time of actuation, then activation of the at least one parking brake 6 can be delayed until a stationary state is ascertained. In this case, an additional deceleration of the motor vehicle 1 can be performed actively, and/or a user can be prompted to perform the deceleration.

Ascertaining the stationary state of the motor vehicle 1 can, during a deceleration and the duration thereof, be performed based on the maximum possible speed by determining the time required until the motor vehicle 1 is stationary. Determination of the stationary state can alternatively or additionally be performed by determining a current speed of the motor vehicle 1 during the deceleration and the period of time starting from the maximum possible speed.

Figure 2:
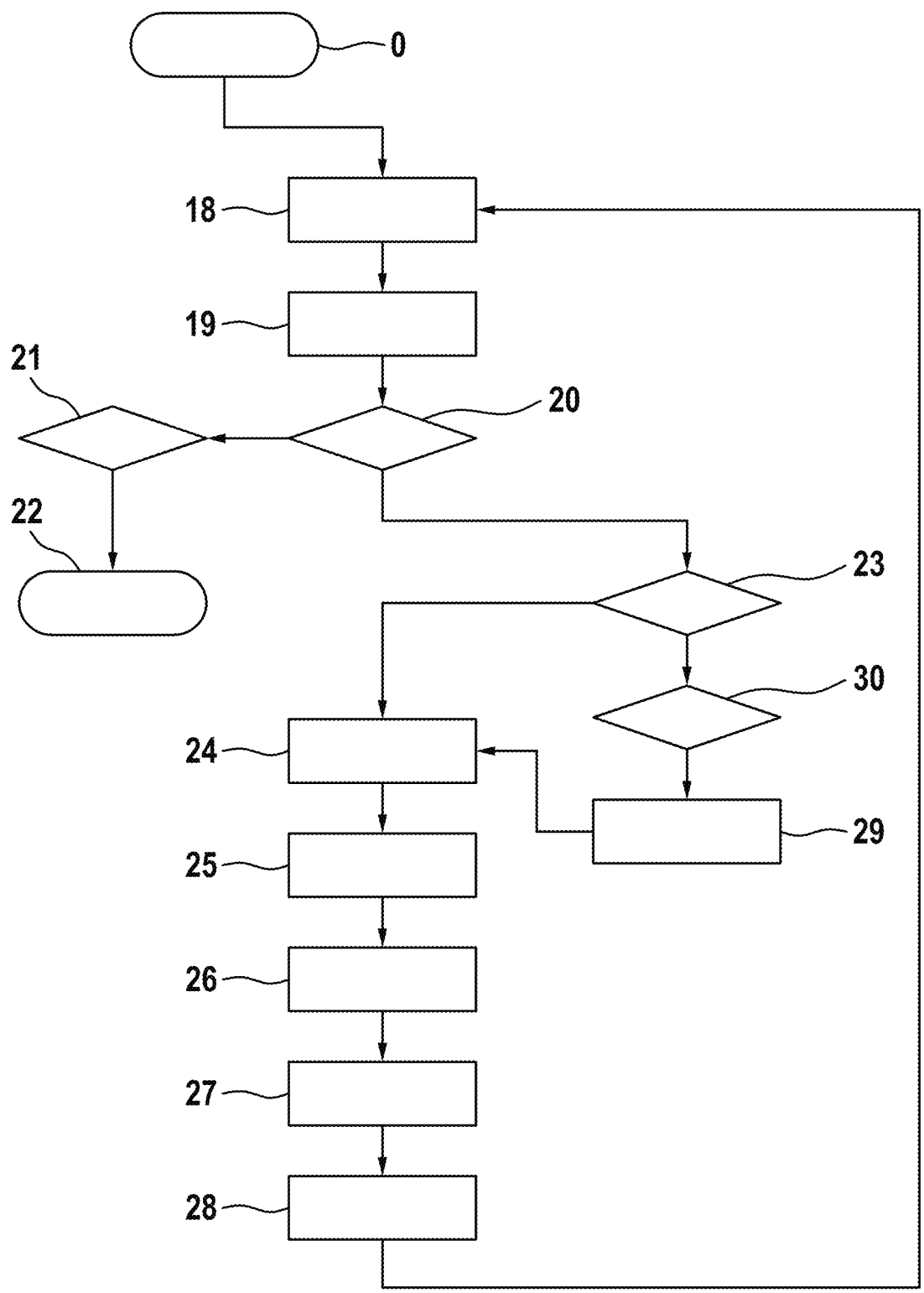
FIG. 2 — a flowchart explaining a method of operating the brake system.

The method described hereinabove for activating the parking brake device 5 can in particular be performed according to the flow diagram shown in FIG. 2. In the exemplary embodiment shown, the determined current speed is used to ascertain the stationary state of the motor vehicle 1. It is further assumed that the speed is known at the initial time 0.

The method is initiated at a known speed as of the initial time 0. In a method action 18 (hereinafter also referred to as the speed action 18), the known speed is defined as the current speed of the motor vehicle 1. Based on the current speed, a method action 19 (hereinafter also referred to as a maximizing action 19) estimates a maximum possible speed of the motor vehicle 1 by taking into account a maximum possible acceleration of the motor vehicle 1. In a subsequent method action 20 (hereinafter also referred to as the comparative action 20), it is compared whether the maximum possible speed estimated in the maximization action 19 is zero, i.e., the motor vehicle 1 is stationary. If this is the case (i.e., the estimated maximum possible speed is zero), then a stationary state of the motor vehicle 1 is then ascertained. This is particularly true if the current speed in the speed action 18 is zero and there was no acceleration of the motor vehicle 1 to account for during the maximization action 19. In a subsequent method action 21 (referred to hereinafter also as the first query action 21), the state of the trigger device 13 is interrogated. If the trigger device 13 is actuated, the activation of the at least one parking brake 12 is performed in a subsequent method action 22 (referred to hereinafter also as the activation action 22). The at least one parking brake 12 is thus activated as long as the trigger device 13 is actuated and the determined current speed is zero.

If the result in the comparator action 20 is a current speed that deviates from zero, the motor vehicle 1 is not stationary according to the determined current speed and the state of the trigger device 13 is then interrogated in a method action 23, i.e., whether the trigger device 13 is actuated. Regarding these method actions 23, a query action 23 (hereinafter also referred to as the second query action 23) is performed in order to better differentiate from the first query action 21. If the second query action 21 results in a lack of actuation of the trigger device 13, then the deceleration and the resulting (and then current) speed are subsequently determined.

To this end, a method action 24 determines and/or queries the adjustment travel of the input rod 10. In the following method actions 25, the brake pressure is determined based on the adjustment travel of the input rod 10. In the method action 25, the adjustment travel is therefore converted into brake pressure. In a subsequent method action 26, the deceleration of the motor vehicle 1 achieved with the brake pressure is determined based on the brake pressure. In addition, the period of deceleration is determined or queried in a method action 27. A subsequent method action 28 (hereinafter also referred to as update action 28) uses the determined deceleration as well as the period of time to ascertain the resulting speed v, which is based on the speed determined in the comparative action 18 as a result of the deceleration and the period of time thereafter. The current speed is then updated during the update action 28. The method then returns to the speed action 18 at the current speed determined during the updating action 26, in which case the speed action 18 replaces the previously determined current speed determined during the updating action 26, i.e., the speed at the first iteration at the initial time.

If the result of the second query action 23 is an actuated state of the trigger device 13, that is the trigger device 13 is actuated and the current speed is not equal to zero, then the input rod 10 can during a method action 29 be adjusted by way of a predetermined adjustment travel. These method actions 29 can therefore also be referred to as active service brake actions 29. The method then proceeds to method action 24, with the predetermined adjustment of the input rod 10 performed in the service brake action 29 being considered accordingly. As can be gathered from FIG. 2, it is possible, before performing the service brake action 29, to verify in a method action 30 whether the input rod 10 has already been adjusted and to perform the service brake action 29 only if the result of the verification is above a predetermined value in the method action 30, i.e., only if the adjustment travel is less than a predetermined value.

In the motor vehicle 1, the method according to the disclosure is implemented using a control device 32 designed accordingly. This can be done by means of a computer program product stored in the control device 32. Preferably, the control device 32 is separate from the control unit 16. The control device 32 is in particular a main control unit 33 of the motor vehicle 1. For this purpose, the control device 32 is correspondingly communicatively connected to the at least one parking brake 12, the trigger device 13, the brake transmission device 4, and the drive device 31.

The invention claimed is:

1. A method for operating a brake system of a motor vehicle, the brake system comprising (i) a service brake device having at least one service brake, (ii) a braking force transmission device having an output rod for transmitting a braking force for braking to the at least one service brake, (iii) a parking brake device having at least one parking brake, and (iv) a trigger device for activating the at least one parking brake, the method comprising:
   determining a deceleration acting on the motor vehicle due to the at least one service brake depending on an adjustment travel of the output rod;
   utilizing a maximum possible speed of the motor vehicle;
   determining, based on (i) the maximum possible speed, (ii) the determined deceleration, and (iii) a time period of the deceleration, whether the motor vehicle is stationary at a time of actuation when the trigger device is actuated; and
   actuating the at least one parking brake when the motor vehicle is ascertained as being stationary at the time of actuation.

2. The method according to claim 1, wherein the braking force transmission device is coupled to an actuator for actuating the at least one service brake, such that the braking force transmission device adjusts the output rod along the adjustment travel, depending on the actuator.

3. The method according to claim 1, further comprising:
   when a stationary state is not ascertained at the time of actuation, the at least one service brake is not be activated until the motor vehicle is ascertained as being stationary.

4. The method according to claim 1, further comprising:
   when a stationary state is not ascertained at the time of actuation:
      actuating the at least one service brake at a predetermined braking force, and
      activating the at least one parking brake when the motor vehicle is ascertained as being stationary.

5. The method according to claim 4, further comprising:
   when a stationary state is not ascertained at the time of actuation, outputting a message with a request for a user to continue actuating the trigger device.

6. The method according to claim 1, wherein the utilization of the maximum possible speed is based on a speed of the motor vehicle known at an initial time.

7. The method according to claim 6, wherein the initial time is a time of a failure of a rotational wheel speed sensor of the motor vehicle and/or a time when the motor vehicle is stationary.

8. The method according to claim 1, wherein the utilization of the maximum possible speed is performed based on an estimation depending on a rotational speed of a drive device of the motor vehicle and a transmission of the rotational speed to at least one driven wheel of the motor vehicle.

9. A motor vehicle comprising:
   a brake system including:
      a service brake device having at least one service brake,
      a braking force transmission device having an output rod configured to transmit a braking force to the at least one service brake using the output rod,
      a parking brake device having at least one parking brake and a trigger device configured to activate the at least one parking brake, and
      a control device configured to:
         determine a deceleration acting on the motor vehicle due to the at least one service brake depending on an adjustment travel of the output rod;
         utilize the maximum possible speed of the motor vehicle;
         determine, based on (i) the maximum possible speed, (ii) the determined deceleration, and (iii) a time period of the deceleration, whether the motor vehicle is stationary at a time of actuation when the trigger device is actuated; and
         actuate the at least one parking brake when the motor vehicle is ascertained as being stationary at the time of actuation.

10. The motor vehicle according to claim 9, wherein the brake booster device is operated electromechanically.

* * * * *